(12) United States Patent
Smook et al.

(10) Patent No.: US 7,771,127 B2
(45) Date of Patent: Aug. 10, 2010

(54) BEARING ASSEMBLY FOR SUPPORTING A TRANSMISSION SHAFT IN A HOUSING

(75) Inventors: Warren Smook, Gauteng (BE); Andy Maes, Eksaarde (BE)

(73) Assignee: Hansen Transmissions International, Edegem (BE)

( * ) Notice: Subject to any disclaimer, the term of this patent is extended or adjusted under 35 U.S.C. 154(b) by 615 days.

(21) Appl. No.: 11/792,715

(22) PCT Filed: Jan. 9, 2006

(86) PCT No.: PCT/BE2006/000002
§ 371 (c)(1),
(2), (4) Date: Jun. 11, 2007

(87) PCT Pub. No.: WO2006/072151
PCT Pub. Date: Jul. 13, 2006

(65) Prior Publication Data
US 2008/0124014 A1 May 29, 2008

(30) Foreign Application Priority Data
Jan. 10, 2005 (GB) ................................. 0500390.0

(51) Int. Cl.
*F16C 19/36* (2006.01)
(52) U.S. Cl. ..................................... 384/571; 384/455

(58) Field of Classification Search ......... 384/452–455, 384/493, 494, 548, 557, 571
See application file for complete search history.

(56) References Cited

U.S. PATENT DOCUMENTS

| | | | | |
|---|---|---|---|---|
| 2,118,760 A * | 5/1938 | Ernst | ........................... | 384/455 |
| 2,314,622 A * | 3/1943 | Klamp | ....................... | 384/563 |
| 5,261,750 A | 11/1993 | Eckhardt et al. | | |
| 5,273,413 A | 12/1993 | Wallin | | |
| 5,409,359 A * | 4/1995 | Takano et al. | ................ | 384/516 |
| 7,572,061 B2 * | 8/2009 | Fox et al. | ..................... | 384/494 |
| 2003/0113049 A1 * | 6/2003 | Shore et al. | .................. | 384/548 |

FOREIGN PATENT DOCUMENTS

DE 86 31 287 U1 1/1987
EP 1 342 570 A1 9/2003

* cited by examiner

Primary Examiner—Thomas R Hannon
(74) Attorney, Agent, or Firm—Young & Thompson

(57) ABSTRACT

Bearing assembly (1) for supporting a transmission shaft (2) in a housing (3), comprising an axially non-locating bearing (5) and a pair of angular contact bearings (7,8) which locate the shaft (2) against movement in axial direction (AA'), whereby the shaft (2) is subjected to radial and/or axial load forces ($F_{rad}, F_{ax}$), characterized in that the housing (2) is adapted in order to obtain the desired stiffness for each of the two angular contact bearings (7,8), whereby a load sharing between said two bearings (7,8) is induced.

17 Claims, 4 Drawing Sheets

BEARING ASSEMBLY FOR SUPPORTING A TRANSMISSION SHAFT IN A HOUSING

FIELD OF THE INVENTION

The present invention relates to a bearing assembly for supporting a transmission shaft in a housing.

More specifically, the present invention relates to a bearing assembly for supporting a transmission shaft in a housing of the so-called hyperstatic type, comprising, on the one hand, an axially non-locating bearing, for example a cylindrical bearing of the NU type having no flanges on the inner bearing ring, and, on the other hand, a pair of angular contact bearings, for example a pair of taper roller bearings, which locate the shaft against movement in axial direction, whereby furthermore the shaft is subjected to radial and/or axial load forces.

BACKGROUND OF THE INVENTION

It is known that such a bearing assembly wherein a shaft is located in both axial directions at one end, while it is not restrained in the axial direction at the other end, has the advantage that squeezing of the rolling elements and increased tensions in the bearings due to axial thermal expansion of the shaft during operation are avoided.

Furthermore, it is known that a shaft supported by such a bearing assembly can easily be mounted and removed in a housing, since the shaft can slide in and out the axially non-locating bearing without the need for complete removal or mounting of said bearing.

For this reason, the axially non-locating bearing may be placed in the most remote position from the aperture in the housing through which said shaft is inserted in the housing.

However, the known designs of hyperstatic bearing assemblies of the above-described type have also some disadvantages, since the load forces on the pair of angular contact bearings are very unevenly distributed, whereby one angular contact bearing takes almost all radial and axial load forces when the shaft is rotating in a first direction, whereas the other bearing takes all the radial and axial load forces when the shaft is rotating in the opposite direction.

This disadvantage is the more important in the case a shaft is supported which rotates most of the time only in one direction and just very exceptionally in the opposite direction, which is for example the case for a shaft that is connected to the rotor of a windturbine.

In other words, depending on the direction of rotation of the shaft, the first or the second angular contact bearing of the pair is not or almost not subjected to load forces during rotation of the shaft.

So, in the case the shaft is mostly rotating in only one direction of rotation, whereby there is a substantial axial load component on the shaft, for example due to interaction between helical gear wheels, there is one bearing that is most of the time unloaded, so that the costs related to this bearing are not justifiable.

Moreover, since said bearing is not or almost not subjected to load forces, there is a great risk that slip of the rolling elements in said bearing occurs, which results in premature damage of the bearing.

For shafts which rotate at high speeds, as for example the high speed shaft of a windturbine gear box, whereby no substantial load is applied, it is even more likely that such a slipping of the rolling elements will happen.

In some known bearing assemblies said problem is solved by the addition of springs, etc . . . which exert always a certain pre-load force on the least charged bearing.

However, in order to allow the springs to function properly, the outer ring of the bearing which is almost never subjected to any load and which is pre-loaded by the springs, requires to be freely movable in the axial direction, which is in contradiction with the support function of said bearing in case of reverse load conditions.

Furthermore, the production and assembling of such bearing assemblies with springs is much more difficult.

Another disadvantage of the known bearing assemblies is that both taper roller bearings of the pair are, depending on the sense of rotation of the shaft, subjected to all or almost all load forces, which require the bearings to be over-dimensioned.

This has of course also negative consequences for the cost-price of such known bearing assemblies.

SUMMARY OF THE INVENTION

The present invention aims at a bearing assembly, for example a bearing assembly used in a wind turbine, which does not show one or more of the above and other disadvantages.

To this aim, the invention relates to a bearing assembly of the above-described type, wherein the housing is adapted in order to obtain the desired stiffness for each of the two angular contact bearings, whereby a load sharing between said two bearings is induced.

An important advantage of such a bearing assembly according to the present invention is that both angular contact bearings are subjected to load forces, so that a more equal load sharing on the bearings is obtained, allowing for a smaller dimensioning of the bearings, which makes the bearing assembly cheaper and more compact.

Another advantage of such a bearing assembly is that by spreading the loads on both angular contact bearings, there is no danger for slip of the rolling elements in one of the angular contact bearings, so that the expected lifetime of the bearings is guaranteed.

These advantages are of particular interest for shafts which are rotating most of the time in only one direction of rotation and at high speeds, as is for example the case for high speed shafts in windturbine gearboxes.

According to a preferred embodiment of a bearing assembly in accordance with the present invention, at least one of the angular contact bearings is secured in the housing such that it mainly transmits axial load forces from the shaft to the housing and rather a small part of the radial load forces, this angular contact bearing being referred to as the axial bearing and the other angular contact bearing of the pair being referred to as the radial bearing.

An advantage of such a bearing assembly according to this embodiment is that, for the shaft rotating in a certain direction of rotation, the axial bearing is transmitting mainly axial load forces to the housing, while the radial bearing is transmitting mainly radial load forces, so that angular contact bearings with a different geometry can be chosen which are better adapted for transmitting mainly radial or mainly axial load forces.

According to another preferred embodiment of a bearing assembly in accordance with the present invention, the axial bearing is secured in a part of the housing that is stiff in at least one axial direction but relatively compliant in radial direction.

An advantage of such a bearing assembly in accordance with this embodiment, is that the split of load forces in radial and axial load forces which are transmitted to the housing respectively through the radial angular contact bearing and the axial angular contact bearing, is easily realised.

BRIEF DESCRIPTION OF THE DRAWINGS

With the intention of better showing the characteristics of the invention, hereafter, as an example without any restrictive character whatsoever, some preferred forms of embodiment of a bearing assembly according to the present invention for supporting a transmission shaft in a housing are described, with reference to the accompanying drawings, wherein.

DETAILED DESCRIPTION OF EMBODIMENTS

Figure 1:
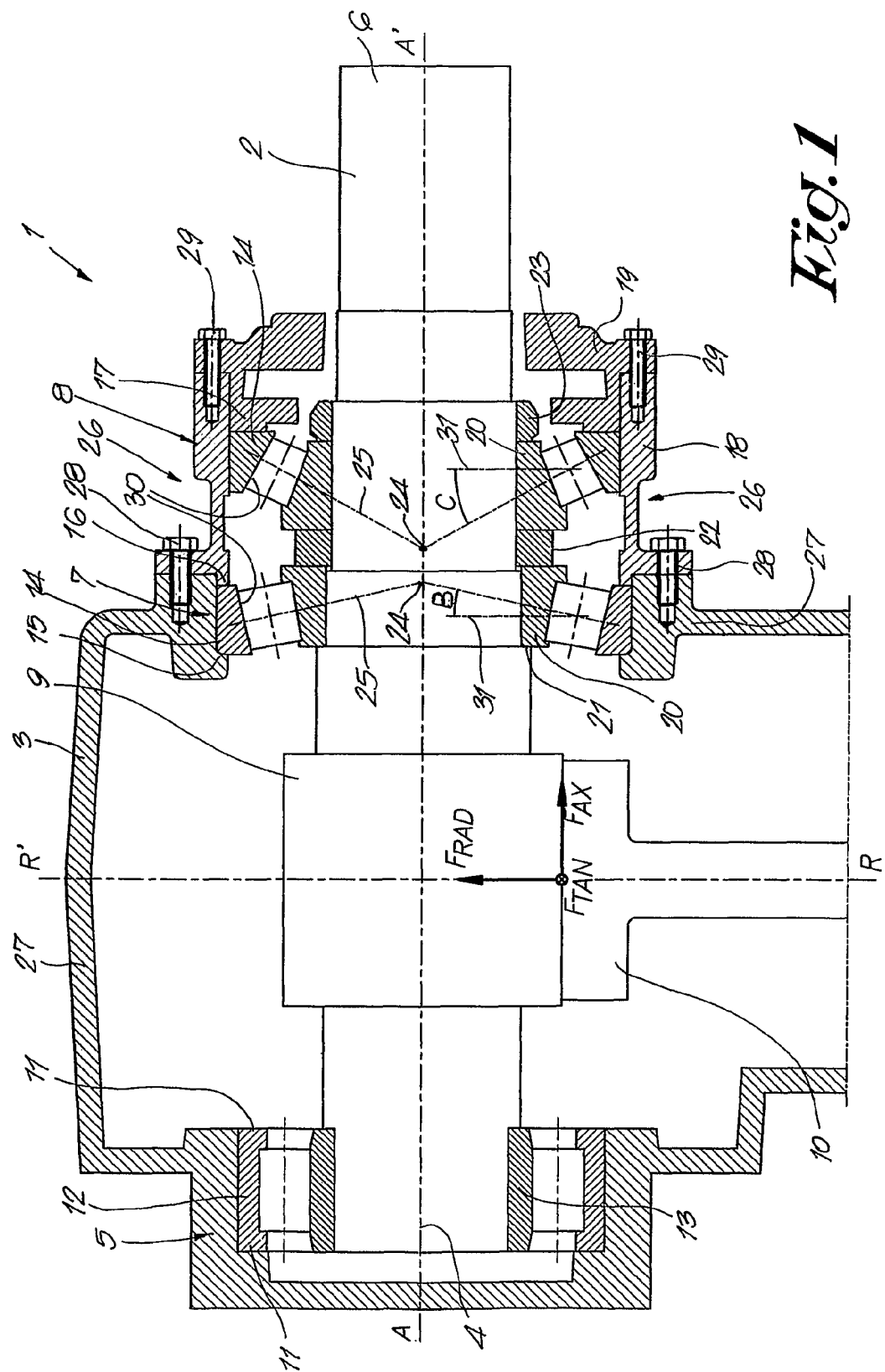
FIG. 1 represents a cross-section of a bearing assembly in accordance with the present invention.

The bearing assembly 1 represented in FIG. 1 is intended for supporting a transmission shaft 2 in a housing 3 and comprises, at one axial end 4 of the shaft 2, an axially non-locating bearing 5, and, in the vicinity of the other axial end 6 of the shaft 2, a pair of angular contact bearings, in particular a pair of taper roller bearings 7 and 8, which locate the shaft 2 against movement in axial direction AA'.

In between the axially non-locating bearing 5 and the pair of taper roller bearings 7 and 8, the shaft 2 is provided with a gear-wheel in the form of a pinion gear 9, for receiving torque from another gear-wheel 10 which is secured on another parallel shaft (not represented in FIG. 1).

The gear-wheel 10 could for example be driven by the rotor blades of a windturbine, whereby the low speed rotation of the rotor blades is transformed in a high speed rotation of shaft 2, for example in a planetary gear stage.

Shaft 2 could for example be intended to be connected to an electric generator at its axial end 6.

The interaction between the two gear-wheels 9 and 10 introduces several load forces, which can be divided in three components.

First of all, there is of course a tangential force component $F_{tan}$ for transmitting torque, which is directed tangentially to the circumference of the gear-wheels 9 and 10, whereby, in this case, said tangential force $F_{tan}$ is directed away from the viewer, indicated in FIG. 1 as conventionally by a little circle and cross, but this load force $F_{tan}$ could also be directed towards the viewer, for example in the case that the gear-wheel 10 is rotating in the opposite direction of rotation.

Secondly, the shaft 2 is subjected to a radial force $F_{rad}$ directed normally to the rotation axis AA' and towards said rotation axis AA'.

Finally, the shaft 2 is also subjected to an axial component $F_{ax}$ directed in a direction parallel to the rotation axis AA' and, in this case, towards the pair of taper roller bearings 7 and 8.

The axial load force $F_{ax}$ is typically significant when helical toothing on the gear-wheels 9 and 10 is applied, whereby the direction of rotation of the gear-wheels 9 and 10, the form of the helical toothing, as well as the condition whether gear-wheel 9 is driving gear-wheel 10 or is being driven by gear-wheel 10, determine whether this axial component $F_{ax}$ is directed towards or away from the pair of taper roller bearings 7 and 8.

However, in the situation of FIG. 1, it is supposed that the conditions are such that most of the time the axial load force $F_{ax}$ is directed towards the pair of taper roller bearings 7 and 8.

In order to keep shaft 2 in its place, the bearings 5, 7 and 8 have to balance the load forces $F_{rad}$ and $F_{ax}$ on the shaft 2 by interaction with the housing 3.

The axially non-locating bearing 5 is, in the case of FIG. 1, a cylindrical roller bearing 5 of the NU type, which has flanges 11 at the outer bearing ring 12, but no flanges at the inner bearing ring 13.

As a consequence, this cylindrical bearing 5 does not allow transmission of the axial load forces $F_{ax}$ from the shaft 2 to the housing 3, so that shaft 2 is not restricted from any movement in the axial direction AA' at the axial end 4 of the shaft 2.

Axial location of shaft 2 is provided by the pair of taper roller bearings 7 and 8, whereby the outer bearing rings 14 of these taper roller bearings 7 and 8 are retained against a shoulder 15 on the housing 3 by means of abutments 16 and 17 respectively on an outer flange part 18 of the housing 3 and on an end cover 19 of the housing 3, and whereby the inner bearing rings 20 are retained against a shoulder 21 on shaft 2 by spacer ring 22 and nut 23.

The pair of taper roller bearings 7 and 8 is in the case of FIG. 1 mounted in a so-called back-to back configuration or X-configuration.

This means that the tops 24 of the pressure cones formed by the pressure lines 25 through which the taper roller bearings 7 and 8 transmit load forces from the shaft 2 to the housing 3, are directed towards one another.

An advantage of the above-described bearing assembly 1, which is common knowledge, is that the shaft 2 is not restrained from axial movement at one axial end 4, so that no problems of increased tensions in the bearings 5, 7 and 8 occur when the shaft 2 is expanding in an axial direction AA', for example due to thermal heating, since the end 4 has one degree of freedom in the axial direction AA' of the shaft 2.

A first particularity of the present invention however, is that the taper roller bearing 8, which further will be referred to as axial bearing 8, is secured in a part 18 of the housing 3 that is relatively stiff in the axial direction AA' in which direction the main axial load forces are exerted, but relatively compliant in radial direction RR'.

As a consequence, said axial bearing 8 mainly transmits axial load forces $F_{ax}$ from the shaft 2 to the housing 3 and rather a small part of the radial load forces $F_{rad}$.

The other taper roller bearing 7, which further will be referred to as the radial bearing 7, is however capable of transmitting such radial load forces $F_{rad}$.

In order to obtain the above-mentioned differences in stiffness of the part 18 of the housing 3, a region 26 of the concerned part 18 can for example be made more flexible than the rest 27 of the housing 3, whereby preferably said region 26 is annular in order to be independent of the radial load force components and situated in between the taper roller bearings 7 and 8. In the case of FIG. 1 the part 18 of the housing 3 which is supporting the axial bearing 8 is realised as a separate flange part 18 of the housing 3, which is secured to the housing by bolts 28, and which is projecting outwardly from the rest of the housing 3 and which is sealed by the above-mentioned cover 19 by means of bolts 29.

The flexibility of part 18 is obtained in this case by executing the flange 18 somewhat thinner at an angular region 26 of the housing 3 between the taper roller bearings 7 and 8, than elsewhere.

It is however possible according to the present invention to obtain the same result by other means, for example by using different kinds of material for the different parts 26 and 27 of the housing, respectively with the characteristic of being more compliant and more stiff in the axial direction AA'.

An additional alternative is to provide the flange 18 with a certain profiling, whereby said region 26 which is made more flexible, is only locally profiled in order to obtain reduced stiffness with regard to the surrounding housing parts 18 and 27.

Another particularity of a bearing assembly 1 according to the present invention, is that the radial bearing 7 and the axial bearing 8 have distinct contact angles, respectively B and C, whereby, by contact angle is meant the angle between a straight line 25 normal to the outer bearing track 30 and a straight line 31 parallel to the plane of rotation.

More specifically, the contact angle B of the radial bearing 7 is smaller than the contact angle C of the axial bearing 8.

Furthermore, in the configuration of FIG. 1, preferably, the radial bearing 7 is situated closer to the gear-wheel 9 than the axial bearing 8.

The operation of a bearing assembly 1 according to the invention is simple and as follows.

Since the region 26 of the outer flange part 18 of the housing 3 is made relatively compliant in the radial direction RR', the axial bearing 8 is not capable or in a limited manner of transmitting radial load forces $F_{rad}$ to the housing 3.

This means that mainly all radial load force $F_{rad}$ is transmitted to the housing 3 by means of cylindrical bearing 5 and radial bearing 7.

On the other hand, due the stiffness of the flange part 18 of the housing 3 in the axial direction, the axial load forces $F_{ax}$ are transmitted to the housing through axial bearing 8.

So, actually, there are two substantially independent force flow paths for transmission of load forces $F_{rad}$ and $F_{ax}$ from the shaft 2 through the pair of taper roller bearings 7 and 8 to the housing 3, whereby the first force flow path is from the shaft 2 through one of the taper roller bearings, in particular axial bearing 8, to the housing 3, substantially solely for transmission of axial load forces $F_{ax}$, whereas the second force flow path is from the shaft 2 through the other taper roller bearing, in particular the radial bearing 7, to the housing 3, substantially solely for transmission of radial load forces $F_{rad}$.

It is obvious that such a bearing assembly 1 is advantageous over the known hyperstatic bearing assemblies, since the load forces $F_{rad}$ and $F_{ax}$ are shared between the pair of taper roller bearings 7 and 8, whereas in the known bearing assemblies only one of the taper roller bearings takes the full load or nearly the full load.

As a consequence, the taper roller bearings 7 and 8 can have smaller dimensions, which is advantageous for the cost-price of the bearing assembly 1, as well as for the space required to mount such a bearing assembly 1, hence the compactness of the bearing assembly 1.

Furthermore, it is clear that slip in the radial bearing 7 is avoided, since this bearing is transmitting radial load force $F_{rad}$ to the housing 3, so that the rolling elements are forced to rotate.

As a consequence, the lifetime of a bearing assembly 1 according to the present invention is ameliorated with respect to the known bearing assemblies.

It is clear that these advantages are particularly important for gear units wherein the shaft 2 is most of the time rotating at high speeds and low torque loads and in the same direction of rotation, as for example is the case when the shaft 2 is a high speed shaft 2 of a windturbine gear box.

A bearing assembly 1 according to the invention is also advantageous for easily mounting and removing of the shaft 2.

By simply loosening the bolts 28 and 29, taper roller bearings 7 and 8, as well as the shaft 2 can be removed and the mounting of the shaft 2 is just as easy by doing the same in the reversed order.

The contact angle C of the axial bearing 8 is smaller than the contact angle B of the radial bearing 7, since it allows for a better transmission of axial load forces $F_{ax}$ to the housing 3.

A bearing assembly 1 according to FIG. 1, wherein the radial bearing 7 is closer to the pinion gear 9 than the axial bearing 8, has also the advantage that the axial bearing 8 is less influenced by radial load forces $F_{rad}$, so that it is easier to realise a housing part 18 that is flexible enough in radial direction RR' in order to prevent transmission of radial forces $F_{rad}$ to the housing 3 through axial bearing 8.

According to the present invention several parameters are preferably mutually adjusted, in order to optimise the load sharing between the bearings 7 and 8.

These parameters are for example:
the stiffness of the housing 3;
the ratio $F_{ax}/F_{rad}$ in the assembly;
the axial relative position of the gear-wheel with regard to the locating and non-locating bearings;
the contact angles B and C of the taper roller bearings 7 and 8; and,
the clearances and the pre-load on the bearings 7 and 8 in the static situation as well as in operation.

The present invention is not restricted to the embodiment of FIG. 1.

Figure 2:
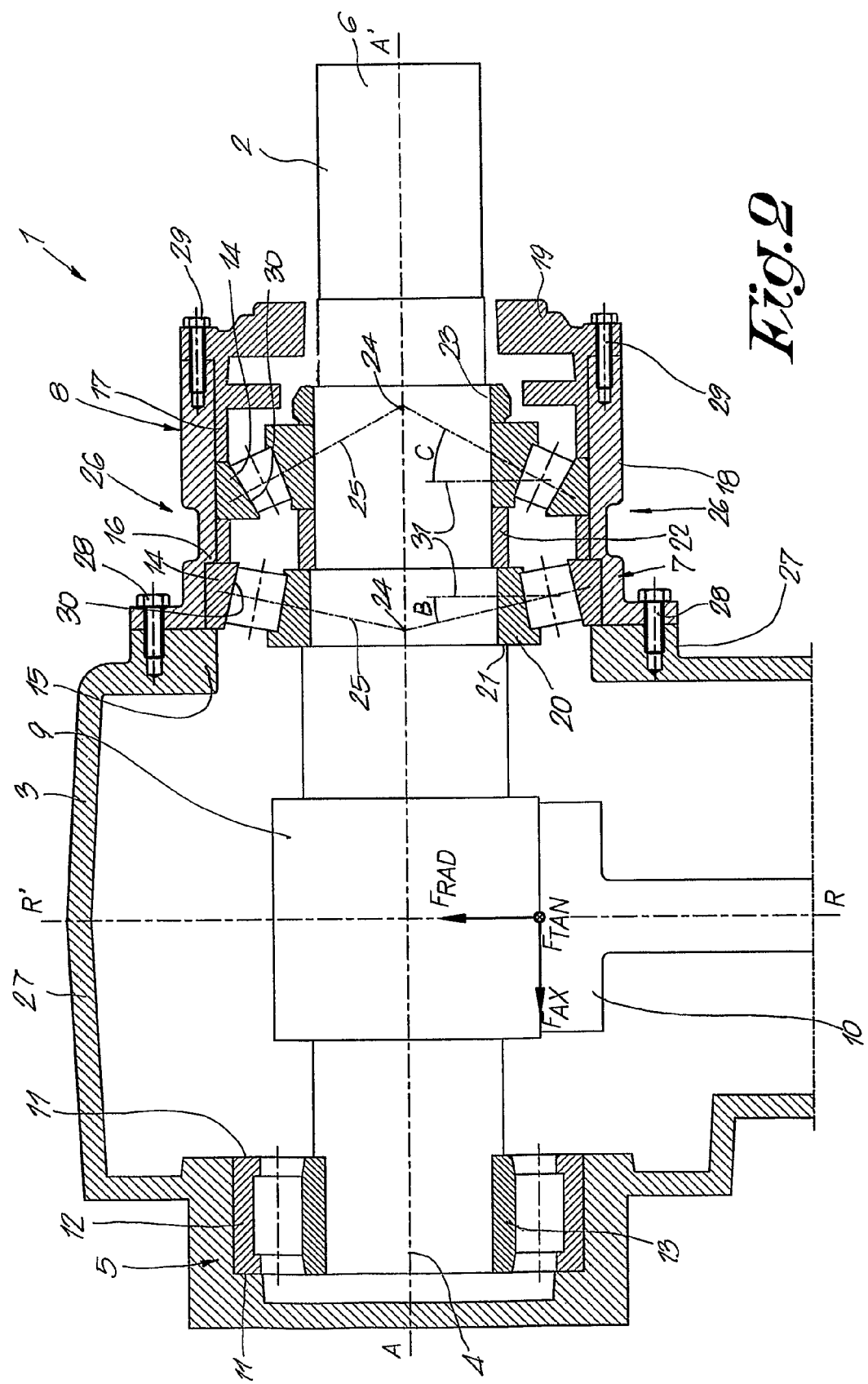
FIGS. 2 and 3 represent views according to FIG. 1 of other embodiments of a bearing assembly according to the present invention; and, FIG. 4 is a more schematic representation of a bearing assembly according to the present invention; and, FIG. 5 to 8 represent schematically alternative embodiments of the present invention.

In FIG. 2, for example, another embodiment of a bearing assembly 1 according to the present invention is represented, whereby the pair of taper roller bearings 7 and 8 is mounted in a so-called face-to face configuration or O-configuration.

This means that the tops 24 of the pressure cones formed by the pressure lines 25 through which the taper roller bearings 7 and 8 transmit load forces from the shaft 2 to the housing 3, are directed away from each other.

Such a bearing assembly 1 according to this embodiment is particularly interesting in the case the shaft 2 is subjected to an axial load force $F_{ax}$ which is directed towards the cylindrical bearing 5.

In that case, the radial bearing 7 is still situated nearer to pinion gear 9, whereby the top 24 of the pressure cone of the radial bearing 7 is near to the pinion gear 9, so that a more stiff bearing assembly 1 is obtained and radial load forces $F_{rad}$ are easily transmitted to the housing 3 by said radial bearing 7.

Figure 3:
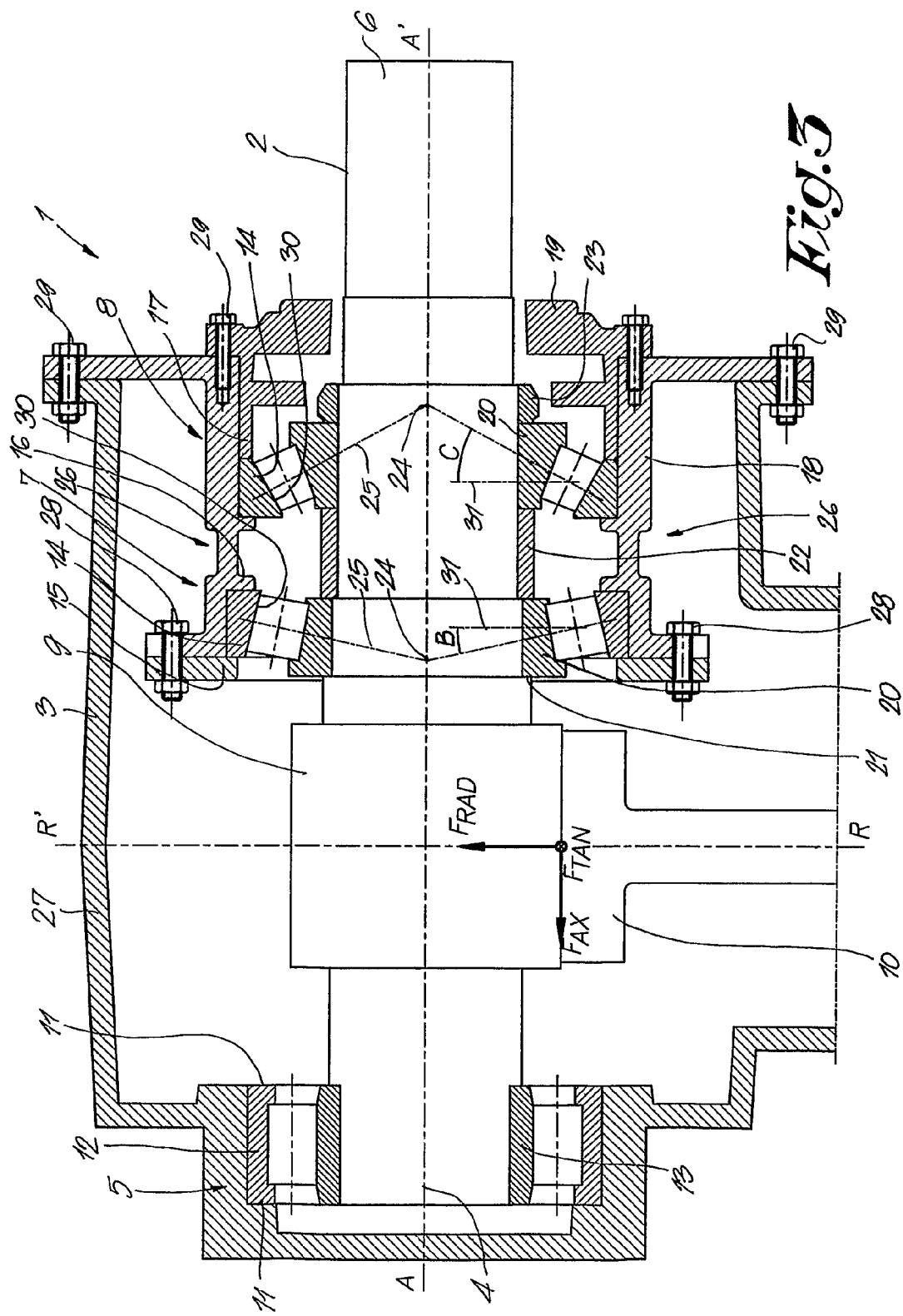

Another embodiment of a bearing assembly 1 according to the present invention is represented in FIG. 3, whereby the flange part 18 of the housing is projecting inwardly into the rest of the housing 27.

Although FIGS. 1 to 4 represent embodiments of the invention in which the angular contact bearings 7 and 8 are at one side 6 of the gear-wheel 9, whereas the axially non-locating bearing 5 is situated at the other side 4 of the gear-wheel 9, it is also possible to apply the invention on bearing assemblies of the so-called cantilever type wherein the angular contact bearing 7 and 8 as well as the axially non-locating bearing 5 are situated at the same side of the gear-wheel 9.

A few configurations of such cantilever type bearing assemblies are represented in FIGS. 5 to 8, whereby a shaft 2 is supported at one side of a gear-wheel 9 by a radial bearing 7, an axial bearing 8 and an axially non) locating bearing 5.

From these figures, it is clear that there is no restriction whatsoever as far as the particular arrangement of the bearings 7, 8 and 9 is concerned.

Finally the invention can also be described in more general terms as follows.

The invention relates to a bearing assembly of the kind which comprises a pair of relatively rotatable bearing surfaces having interposed therebetween a plurality of rotatable members. The invention relates in particular, but not exclusively, to the use of a pair of said bearings in a gear box, for example to support a high speed shaft in the gear box of a wind turbine.

A description is given of how the load sharing can be determined by manipulating the stiffness of the different paths through which the bearing reaction forces are acting.

This description contains an introduction on the working principles of a high speed shaft in a gear box for wind turbines.

Figure 4:
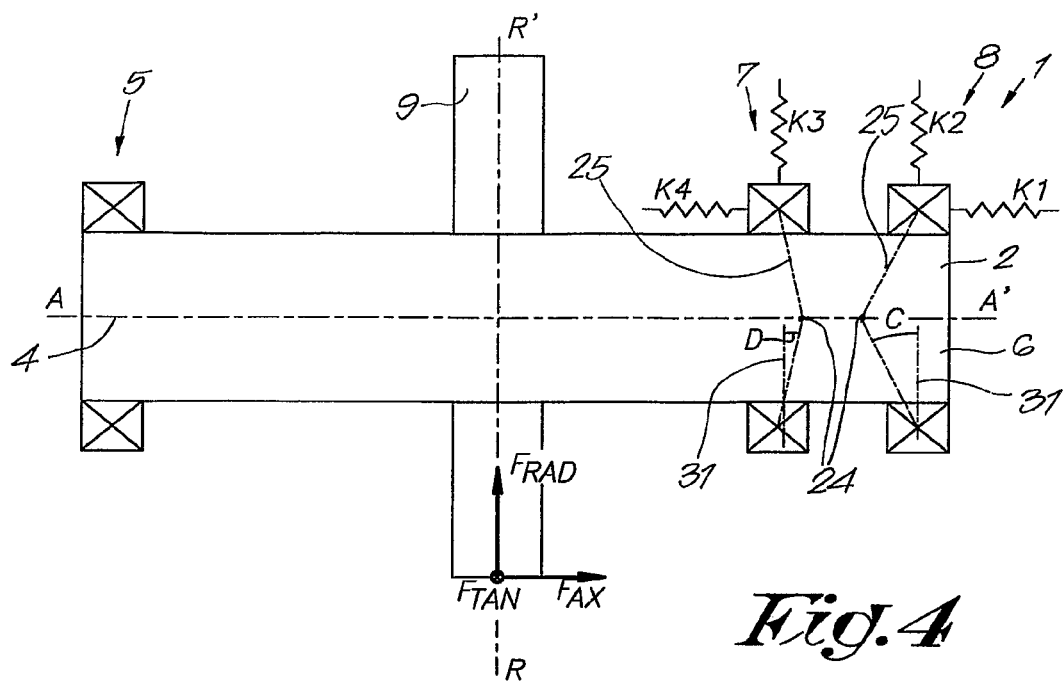
Figure 5:
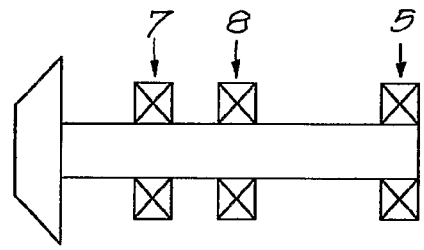
Figure 6:
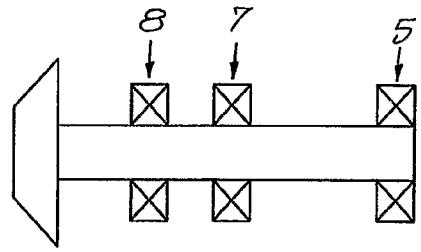
Figure 7:
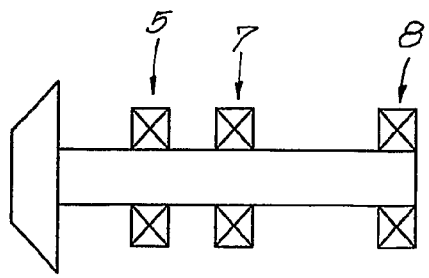
Figure 8:
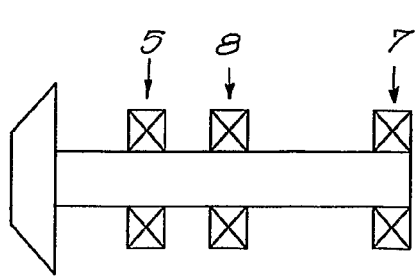

In FIG. 4 such a high speed shaft configuration is shown. The shaft 2 has a pinion gear 9 which introduces three forces:

Force1 ($F_{ax}$), directed along the rotation axis of the shaft, towards the two right bearings;

Force2 ($F_{rad}$), normal to the rotation axis of the shaft;

Force3 ($F_{tan}$), tangent to the circumference of the gear.

The shaft is supported, axially and radially, by three bearings. The left bearing 5 is, typically, a cylindrical roller bearing and only supports forces radially. The middle- 7 and the right bearing 8 are both angular contact bearings (fi. taper roller bearings). These bearings could be mounted in a X or O configuration.

The intention is now to calculate and manipulate all the parameters which influence the load sharing between the two taper roller bearings.

Stiffness of the different load paths;

Contact angle of the angular contact bearing;

Play in the bearing lay-out.

Hereby the most relevant and new parameter is the relative stiffness of the load transfer paths of the two taper roller bearings. This stiffness should be considered both in the axial ($K1, K4$) as in the radial way ($K2, K3$).

By manipulating the stiffness of the radial load path of bearing 7 and bearing 8, the radial loads could be beneficially split between the two bearings. This will induce an optimal load sharing between the two bearings (7 & 8). Because of the angular contact of the bearings, the axially induced forces are also determined.

Taking all the involved parameters into account, an optimum bearing design could be achieved resulting in optimum bearing lifetime.

As an example of a possible implementation, FIG. 1 shows how the bearing housings can be adapted to obtain the desired stiffness for each of the two taper roller bearings.

The load sharing between the two taper roller bearings of FIG. 1 may, for example, be selected preferentially by use of one taper roller bearing which has a size and/or angle different from that of the other taper roller bearing of the pair. Additionally or alternatively the load sharing may be selected preferentially by design of the support structure, typically the radially outer support structure, for each bearing so as to provide one bearing with a more rigid axial/radial support than that provided for the other bearing of the pair. Examples of the manner in which the support structure may be provided with the required characteristics of support include preferential selection of the wall thickness and wall flexibility of the support structure.

The present invention is in no way limited to the embodiments described above and represented in the drawings, but such a gear unit 1 for transmitting torque may be realised in different shapes and dimensions, without departure from the scope of the invention.

The invention claimed is:

1. A bearing assembly for supporting a transmission shaft in a housing, comprising:

an axially non-locating bearing; and a pair of angular contact bearings which locate the shaft against movement in an axial direction, the shaft is subjected to at least one of radial and axial load forces, wherein the housing is adapted in order to obtain a desired stiffness for each of the two angular contact bearings, so that a load sharing between said two angular contact bearings is induced, wherein one of the angular contact bearings is secured in a part of the housing that is stiff in at least the axial direction in which the main axial load forces are exerted, but relatively compliant in a radial direction, and wherein said part of the housing has a region which is made more flexible than a rest of the housing.

2. The bearing assembly according to claim 1, wherein said region which is made more flexible, is annular in order to be independent of radial load force components.

3. The bearing assembly according to claim 1, wherein said region which is made more flexible, is only locally profiled in order to obtain reduced stiffness with regard to surrounding housing parts.

4. The bearing assembly according to claim 1, wherein the region which is made more flexible is situated in between the angular contact bearings.

5. The bearing assembly according to claim 1, wherein the pair of angular contact bearings is mounted in a face-to-face configuration or O-configuration.

6. The bearing assembly according to claim 1, wherein the pair of angular contact bearings is mounted in a back-to-back configuration or X-configuration.

7. The bearing assembly according to claim 1, wherein the axially non-locating bearing is a cylindrical roller bearing, which supports the shaft while allowing the shaft to move in both axial directions.

8. The bearing assembly according to claim 1, wherein the angular contact bearings are taper roller bearings.

9. The bearing assembly according to claim 1, wherein the stiffness of the housing is locally adapted such that said one of the angular contact bearings mainly transmits axial load forces from the shaft to the housing and a small part of the radial load forces, said one of the angular contact bearings being an axial bearing and an other of said angular contact bearings being a radial bearing.

10. The bearing assembly according to claim 9, wherein the part of the housing supporting the axial bearing projects outwardly from the rest of the housing.

11. The bearing assembly according to claim 9, wherein the part of the housing supporting the axial bearing is a separate flange part of the housing.

12. The bearing assembly according to claim 9, wherein the angular contact bearings have distinct contact angles.

13. The bearing assembly according to claim 12, the wherein a contact angle of the radial bearing is smaller than a contact angle of the axial bearing.

14. The bearing assembly according to claim 1, wherein the shaft supports at least one gear-wheel.

15. The bearing assembly according to claim 14, wherein the angular contact bearings are situated at one side of said gearwheel, the axially non-locating bearing is situated at an other side of the gearwheel.

16. The bearing assembly according to claim 14, wherein the angular contact bearings as well as the axially non-locating bearing are situated at a same side of the gearwheel.

17. A bearing assembly for supporting a transmission shaft in a housing, comprising:
- an axially non-locating bearing; and
- a pair of angular contact bearings which locate the shaft against movement in an axial direction, the shaft is subjected to at least one of radial and axial load forces,
- wherein the housing is adapted in order to obtain a desired stiffness for each of the two angular contact bearings, so that a load sharing between said two angular contact bearings is induced,
- wherein one of the angular contact bearings is secured in a part of the housing that is stiff in at least the axial direction in which the main axial load forces are exerted, but less stiff in a radial direction, and
- wherein the part of the housing supporting said one of the angular contact bearings projects inwardly into the rest of the housing.

* * * * *